US008692933B1

(12) United States Patent
Namboodri

(10) Patent No.: US 8,692,933 B1
(45) Date of Patent: Apr. 8, 2014

(54) METHOD AND APPARATUS FOR BUFFERING ANCHOR FRAMES IN MOTION COMPENSATION SYSTEMS

(71) Applicant: Marvell International Ltd., Hamilton (BM)

(72) Inventor: Vipin Namboodri, Bangalore (IN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/653,259

(22) Filed: Oct. 16, 2012

Related U.S. Application Data

(60) Provisional application No. 61/549,372, filed on Oct. 20, 2011.

(51) Int. Cl.
*H04N 7/01* (2006.01)
*H04N 11/20* (2006.01)

(52) U.S. Cl.
USPC ........... 348/452; 348/451; 348/458; 348/459; 348/469; 348/441; 348/443; 348/445; 348/446; 348/448; 348/620; 348/669; 348/699; 348/700; 348/698; 348/555; 348/543; 348/534; 348/3.3

(58) Field of Classification Search
USPC ......... 348/452, 441, 446, 448, 458, 459, 443, 348/445, 451, 469, 620, 669, 699, 700; 345/698, 3.3, 555, 543, 534; 382/181
See application file for complete search history.

(56) References Cited

U.S. PATENT DOCUMENTS

| 5,005,077 | A  | * | 4/1991 | Samad et al. | 348/452 |
|---|---|---|---|---|---|
| 5,012,336 | A  | * | 4/1991 | Gillard | 348/452 |
| 5,016,102 | A  | * | 5/1991 | Avis | 348/452 |
| 5,337,154 | A  | * | 8/1994 | Dorricott et al. | 348/448 |
| 5,936,616 | A  | * | 8/1999 | Torborg et al. | 345/555 |
| 6,366,289 | B1 | * | 4/2002 | Johns | 345/543 |
| 7,265,791 | B2 | * | 9/2007 | Song et al. | 348/448 |
| 7,405,766 | B1 | * | 7/2008 | Chou et al. | 348/448 |
| 7,474,355 | B2 | * | 1/2009 | Leone et al. | 348/453 |
| 7,483,079 | B2 | * | 1/2009 | Kondo et al. | 348/458 |
| 7,542,095 | B2 | * | 6/2009 | Zhou et al. | 348/452 |
| 7,667,773 | B2 | * | 2/2010 | Han | 348/452 |
| 7,880,812 | B2 | * | 2/2011 | Tani | 348/558 |
| 8,264,600 | B2 | * | 9/2012 | Kondo et al. | 348/441 |
| 2003/0133040 | A1 | * | 7/2003 | Konodo et al. | 348/441 |
| 2004/0061712 | A1 | * | 4/2004 | Sogawa | 345/698 |
| 2004/0189875 | A1 | * | 9/2004 | Zhai et al. | 348/669 |
| 2009/0067722 | A1 | * | 3/2009 | Lin et al. | 382/181 |
| 2009/0073311 | A1 | * | 3/2009 | Hamada et al. | 348/441 |
| 2010/0013991 | A1 | * | 1/2010 | Miyazaki et al. | 348/452 |
| 2010/0165014 | A1 | * | 7/2010 | Wu | 345/698 |

\* cited by examiner

*Primary Examiner* — Jefferey Harold
*Assistant Examiner* — Mustafizur Rahman

(57) ABSTRACT

In an embodiment, there is provided a video processing component comprising a compensation engine configured to generate pixels of a first video frame from a second video frame based at least in part on specified pixel motion; and an access buffer configured to store pixel data corresponding to pixels of the second video frame for reference by the compensation engine, wherein the pixel data is stored by the access buffer at different vertical resolutions depending on vertical distances of the pixels corresponding to the pixel data from a target pixel that is indicated by the compensation engine.

21 Claims, 2 Drawing Sheets

METHOD AND APPARATUS FOR BUFFERING ANCHOR FRAMES IN MOTION COMPENSATION SYSTEMS

CROSS-REFERENCE TO RELATED APPLICATION

The present disclosure claims priority to U.S. Provisional Patent Application No. 61/549,372, filed on Oct. 20, 2011, which is incorporated herein by reference.

TECHNICAL FIELD

This disclosure relates to video processing. More particularly, this disclosure relates to motion compensation such as used in video frame rate interpolation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Video is typically defined by a sequence of image frames that are displayed at a fixed frequency generally referred to as a video frame rate. It often becomes necessary to convert a video stream from one frame rate to another frame rate in order to provide compatible frame sequences for different types of display technologies, such as different types of television or video displays.

Motion compensation may be used when converting from a given frame rate to a higher frame rate in order to synthesize the additional video frames required by the higher frame rate. As an example, a 24 frames/second video stream may be converted to a 120 frames/second video stream by synthesizing new, intermediate frames to be inserted between existing frames. For each pair of temporally adjacent frames of the original stream, generally referred to as reference frames or anchor frames, an additional four intermediate frames are synthesized and inserted between the original anchor frames.

In certain systems, motion compensation may be performed by a compensation engine in response to motion vectors that have been received or calculated for individual pixels. Each motion vector specifies the movement of a particular pixel between one anchor frame and an adjacent anchor frame in terms of direction and displacement. Intermediate frames may then be generated by appropriately interpolating the motion vectors and displacing pixels from one of the anchor frames in accordance with the interpolated motion vectors.

The anchor frames are typically stored in system memory such as DRAM (dynamic random-access memory) or DDR SDRAM (double data rate synchronous dynamic random-access memory). In order to increase the speed and efficiency of motion compensation and intermediate frame generation, certain portions of current anchor frames may be buffered to provide high-speed access to the data of the anchor frames. For example, an access buffer may be configured to store a range of pixel lines or rows that are nearby the pixel line that is currently being processed by the compensation engine under the assumption that the motion of a pixel from one frame to the next will usually be within some practical vertical limit. With increasing resolutions for various types of displays, however, the sizes of line buffers have become quite large, and now often require significant semiconductor die area.

SUMMARY

In an embodiment, there is provided a video processing component comprising a compensation engine configured to generate pixels of a first video frame from a second video frame based at least in part on specified pixel motion; and an access buffer configured to store pixel data corresponding to pixels of the second video frame for reference by the compensation engine, wherein the pixel data is stored by the access buffer at different vertical resolutions depending on vertical distances of the pixels corresponding to the pixel data from a target pixel that is indicated by the compensation engine. The pixel data corresponding to pixels at increasing vertical distances from the target pixel is stored at decreasing vertical resolutions. The second video frame comprises lines of pixels; and the access buffer is repeatedly updated to store pixel data corresponding to lines of the second video frame that are vertically above and below the target pixel. In an embodiment, the pixel data stored by the access buffer corresponds to a first set of pixels that are within a first vertical distance of the target pixel, a second set of pixels that are outside the first vertical distance and within a second vertical distance of the target pixel, and a third set of pixels that are outside the second vertical distance and inside a third vertical distance of the target pixel; the pixel data corresponding to the first set of pixels is stored at a first vertical resolution; the pixel data corresponding to the second set of pixels is stored at a second vertical resolution that is lower than the first vertical resolution; and the pixel data corresponding to the third set of pixels is stored at a third vertical resolution that is lower than the second vertical resolution. In an embodiment, the pixel data corresponding to at least some of the pixels of the second video frame is vertically downsampled for storing in the access buffer.

In an embodiment, there is also provided a method comprising generating pixels of a first video frame from a second video frame based at least in part on specified pixel motion; and buffering pixel data corresponding to pixels of the second video frame at different vertical resolutions depending on vertical distances of the pixels corresponding to the pixel data from a target pixel of the second video frame. In an embodiment, the pixel data corresponding to pixels at increasing vertical distances from the target pixel is buffered at decreasing levels of vertical resolution. In an embodiment, the second video frame comprises lines of pixels, and the buffering comprises buffering lines of the second video frame that are vertically above and below the target pixel. In an embodiment, the buffered pixel data corresponds to a first set of pixels that are within a first vertical distance of the target pixel; a second set of pixels that are outside the first vertical distance and within a second vertical distance of the target pixel, and a third set of pixels that are outside the second vertical distance and inside a third vertical distance of the target pixel; the pixel data corresponding to the first set of pixels is buffered at a first vertical resolution; the pixel data corresponding to the second set of pixels is buffered at a second vertical resolution that is lower than the first vertical resolution; and the pixel data corresponding to the third set of pixels is buffered at a third vertical resolution that is lower than the second vertical resolution. In an embodiment, the method further comprises vertically downsampling the pixel data corresponding to at least some of the pixels of the second video frame.

In an embodiment, there is also provided a software program embodied upon a computer readable medium and operable to cause a video processing component to perform actions, wherein the actions comprise generating pixels of an intermediate video frame from an anchor video frame based at least in part on specified pixel motion; and buffering pixel data corresponding to pixels of the anchor video frame at different vertical resolutions depending on vertical distances of the pixels corresponding to the pixel data from a target pixel of the intermediate video frame. In an embodiment, the pixel data corresponding to pixels at increasing vertical distances from the target pixel is buffered at decreasing levels of vertical resolution. In an embodiment, the anchor video frame comprises lines of pixels; and the buffering comprises buffering lines of the anchor video frame that are vertically above and below the target pixel. In an embodiment, the buffered pixel data corresponds to a first set of pixels that are within a first vertical distance of the target pixel, a second set of pixels that are outside the first vertical distance and within a second vertical distance of the target pixel, and a third set of pixels that are outside the second vertical distance and inside a third vertical distance of the target pixel; the pixel data corresponding to the first set of pixels is buffered at a first vertical resolution; the pixel data corresponding to the second set of pixels is buffered at a second vertical resolution that is lower than the first vertical resolution; and the pixel data corresponding to the third set of pixels is buffered at a third vertical resolution that is lower than the second vertical resolution. In an embodiment, the actions further comprising vertically downsampling the pixel data corresponding to at least some of the pixels of the anchor video frame which is buffered.

BRIEF DESCRIPTION OF THE DRAWINGS

Embodiments of the present disclosure will be readily understood by the following detailed description in conjunction with the accompanying drawings. To facilitate this description, like reference numerals designate like elements.

DETAILED DESCRIPTION

The following description merely provides examples and is in no way intended to limit the disclosure, its application, or uses.

Figure 1:
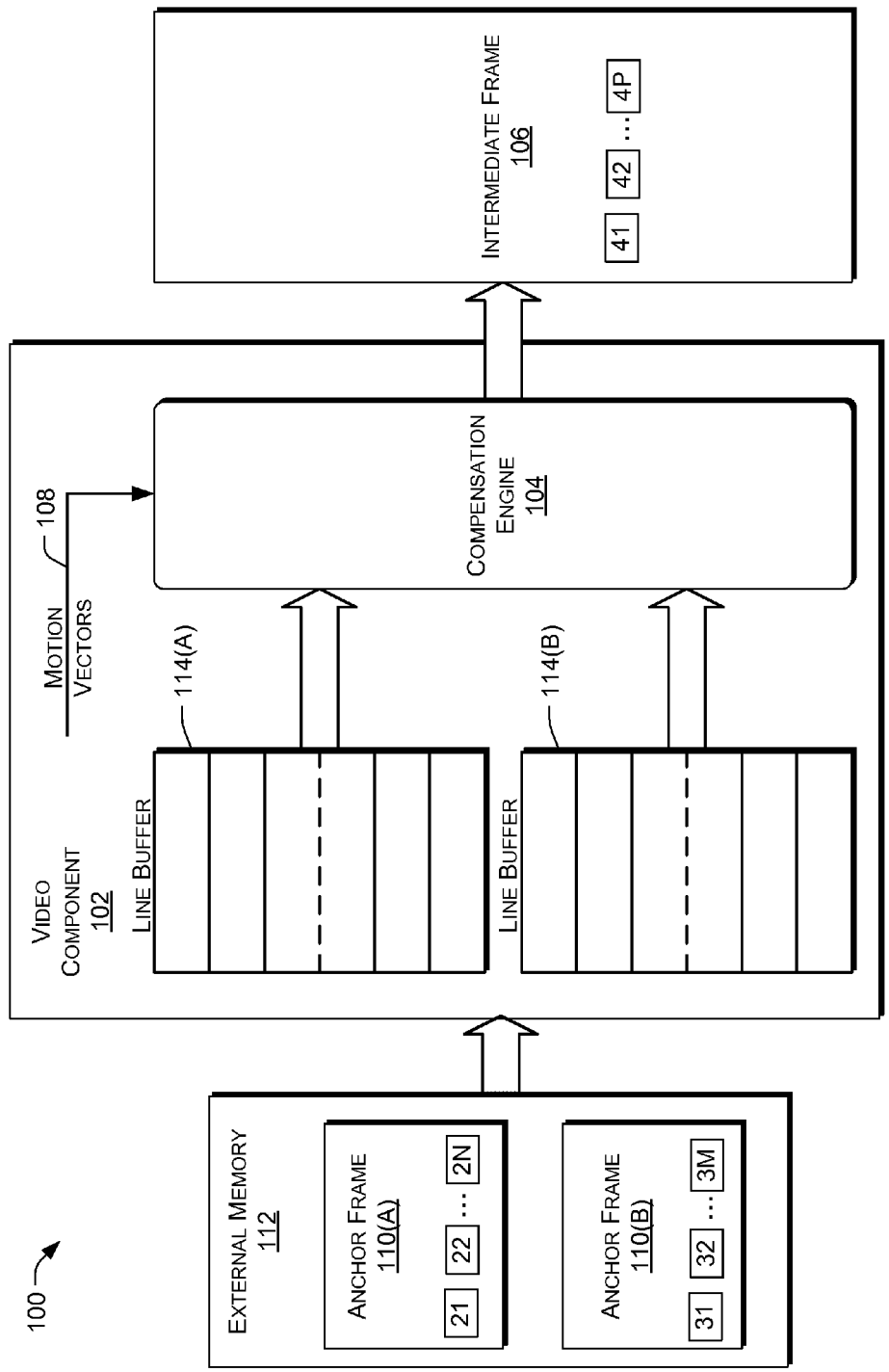
FIG. 1 is a functional block diagram of a video processing system incorporating anchor frame buffering techniques in accordance with an embodiment of the present disclosure.

FIG. 1 shows an example video processing system 100 that performs motion compensation to convert a video stream from a first frame rate to a second, higher frame rate. More specifically, the system 100 synthesizes intermediate frames for insertion between anchor frames of an original video stream in order produce a video stream having a higher frame rate relative to the original video stream.

The system 100 includes a video component 102, which may comprise an integrated circuit or semiconductor device. The system 100 is included in, or is associated with, for example, a frame rate up conversion (FRUC) unit for reducing motion blur in sample and hold displays (e.g., a liquid crystal display (LCD) television, a LCD panel, etc.)), a FRUC unit to reduce wide area flicker in impulse displays (e.g., a plasma display, a plasma television, etc.), a FRUC unit to reduce motion judder, a frame rate converter, a motion compensation based de-interlacer, and/or the like. In addition to the elements shown in FIG. 1, the video component 102 may have other elements and may implement other functions. For example, the video component 102 may have various video processing engines for performing other tasks, such as for determining or calculating motion vectors for pixels of a video stream and for dealing with related matters.

The video component 102 may include a compensation engine 104 that synthesizes one or more intermediate frames 106 based on a set of received motion vectors 108 and one or more anchor frames 110. FIG. 1 illustrates two anchor frames, 110(A) and 110(B), which are examples of adjacent video frames of a video stream that is to be converted from a given frame rate to a higher frame rate. The anchor frames 110(A) and 110(B) are stored in a memory 112. Although FIG. 1 illustrates the memory 112 storing only two anchor frames 112(A) and 110(B), in an embodiment, the memory 112 stores more than two anchor frames, only two of which are illustrated as examples in FIG. 1. Each anchor frame 110 specifies an image. The image is defined by lines of pixels. Each pixel is defined by a set of pixel data. Pixel data may comprise one or more values indicating the visual characteristics of a corresponding pixel, such as the color and brightness of the pixel. Example pixels 21, 22, . . . 2N of the anchor frame 110(A), example pixels 31, 32, . . . 3M of the anchor frame 110(B), and example pixels 41, 42, . . . 4P of the intermediate frame 106 are illustrated in FIG. 1, where N, M and P are appropriate integers.

The motion vectors 108 may be generated by other components (not shown) of the video component 102, or may accompany a source video stream. In an embodiment, a motion vectors is generated based on a movement of a particular pixel from an anchor frame (e.g., the anchor frame 110(A)) to an adjacent anchor frame (e.g., the anchor frame 110(B)) in terms of direction and displacement. For example, the motion vector is generated based on an estimate of a motion of an object from the anchor frame 110(A) to the anchor frame 110(B). The compensation engine 104 may also be configured to deal with newly occluded or revealed pixels, which are not associated with motion vectors.

The anchor frames 110 are typically stored in or available from the memory 112, which may comprise DDR SDRAM (double data rate synchronous dynamic random-access memory) or some other type of random-access memory. The memory 112 may be external to the video component 102, in the sense that it may not be integrated on the same semiconductor die as the elements of the video component 102. Communications between the video component 102 and the memory 112 may take place over an inter-component data communications bus.

The video component 102 also has one or more internal line buffers 114, also referred to as access buffers, that are configured to temporarily store pixel data corresponding to portions of the current anchor frames 110. The line buffers 114 may be implemented using a type of high-speed random-access memory, providing higher access rates than are available when retrieving data from the external memory 112. In an embodiment, the line buffers 114 are integrated on the same semiconductor die as other elements of the video component 102.

In the illustrated embodiment, the video component 102 has two line buffers 114(A) and 114(B), which are used to buffer pixel data corresponding to certain lines of two temporally adjacent anchor frames 110(A) and 110(B), respectively. For example, a first line buffer 114(A) may be used to buffer lines of the first anchor frame 110(A), and the second line buffer 114(B) may be used to buffer lines of the second anchor frame 110(B) that is adjacent and subsequent to the first anchor frame.

For each adjacent pair of anchor frames 110, the compensation engine 104 is configured to synthesize one or more intermediate frames 106 that are to be inserted between the anchor frames 110 in an output video stream, e.g., using the motion vectors 108. An individual intermediate frame 106 is generated from one or the other of the pair of adjacent and surrounding anchor frames 110.

Each of the anchor frames 110 and the intermediate frame 106 comprises lines or rows of pixels, represented by corresponding pixel data. In order to synthesize a current or target pixel of the intermediate frame 106 (e.g., the pixel 42 of the intermediate frame 106), the compensation engine references a corresponding motion vector 108, which provides a positional mapping between pixels of the anchor frames 110 (e.g., the pixel 22 of the anchor frame 110(A) and/or the pixel 32 of the anchor frame 110(B)). Depending on the temporal distances of the intermediate frame 106 from the surrounding anchor frames 110, the compensation engine 104 interpolates based on the motion vector 108 to identify a pixel of one of the anchor frames 110 (e.g., the pixel 22 of the anchor frame 110(A)) that corresponds to the target pixel of the intermediate frame 106. The pixel data of the identified pixel is then copied to the position of the target pixel in the intermediate frame 106.

The identified pixel may be from either the first anchor frame 110(A), which temporally precedes the intermediate frame 106, or from the second anchor frame 110(B), which temporally follows the intermediate frame 106. In practice, the pixel is typically copied from the anchor frame 110 that is closest in time to the intermediate frame 106. Note that in the case of occluded or revealed pixels, the pixel will be available from only one or the other of the anchor frames.

The motion compensation performed by the compensation engine 104 is thus largely a process of retrieving or copying appropriate pixel data from adjacent anchor frames 110, e.g., based on the motion vectors 108. Furthermore, the pixels mostly likely to be of interest at any given time are those at positions relatively near the position of the intermediate frame pixel that is currently being generated, which is referred to herein as the target pixel or the current target pixel.

The compensation engine 104 is configured to process lines of the intermediate frame in a consecutive manner, such as from top-to-bottom. The line buffers 114 are configured to temporarily store pixel data corresponding to pixels of the anchor frames 110 that are near the position of the target pixel, and are dynamically updated as the compensation engine processes consecutive lines of the intermediate frame 106. In the particular embodiment described herein, the line buffers 114 are configured to store pixel data corresponding to lines of anchor frame pixels that are vertically above and below the position of the current target pixel or target line. Each of the buffers 114 is thus updated when the compensation engine 104 moves to a new line of pixels, so that each buffer 114 indicates pixel data for a range of pixel lines surrounding the line that is currently being processed by the compensation engine 104. These lines are those that are most likely to be needed when synthesizing pixels of the intermediate frame 106.

The number of lines stored or represented by each of the line buffers 114 is determined based on an expected vertical motion range, within which vertical motion is expected to be contained. In addition, pixel data corresponding to pixels that are at increasing vertical distances from the line currently being processed may be represented in the line buffers 114 at reduced vertical resolutions. This will be explained in more detail below, particularly with reference to FIG. 3.

Figure 2:
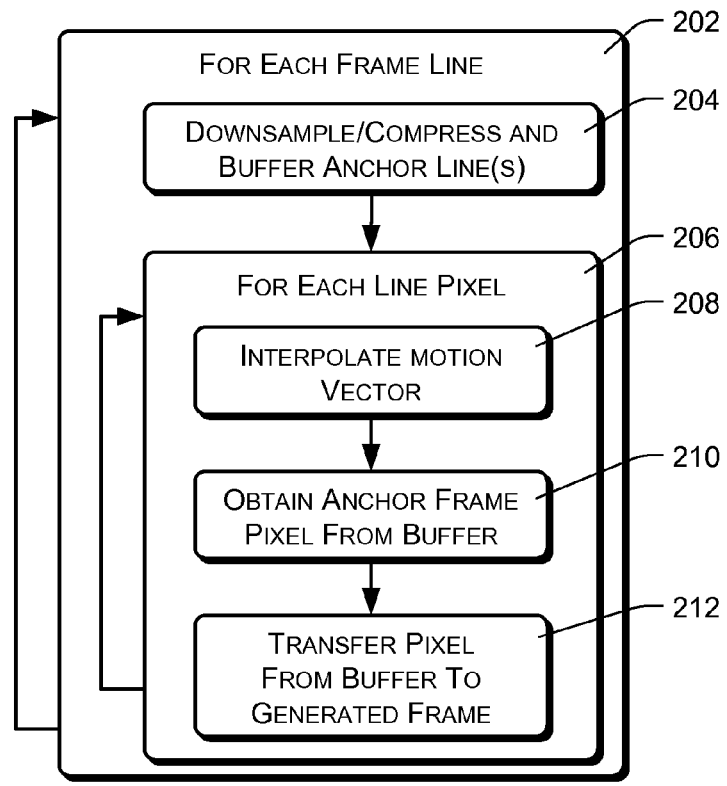
FIG. 2 is a flowchart illustrating a method of synthesizing intermediate frames using anchor frame buffering techniques in accordance with an embodiment of the present disclosure.

FIG. 2 illustrates the motion compensation and pixel data buffering performed by the compensation engine 104. An operation 202 is performed for every pixel line of the intermediate frame 106. At 204, downsampling and buffering pixels of the anchor frames 110 is performed, for example, by retrieving or fetching new or additional lines of the anchor frames 110, so that each buffer 114 continues to contain pixel data corresponding to a range of anchor frame lines surrounding the position of the intermediate frame line that is currently being generated by the compensation engine 104. The downsampling is performed such that the pixel data stored in the buffers 114 is at different levels of vertical resolution, depending on the vertical distances of the corresponding pixels from the current target pixel. The pixel data corresponding to pixels that are vertically nearest the target pixel may be stored or buffered at their original vertical resolution, without downsampling.

In addition to (or instead of) downsampling, at 204, the buffered data, or portions of the buffered data, may be compressed, for example, by applying 4×4 DCT (discrete cosine transform) or wavelet compression.

The operation 202 further comprises operations 206, which may be performed for every pixel of the current line of the intermediate frame 106. Within the operation 206, at 208, a motion vector associated with the target pixel is interpolated, to determine a corresponding pixel of one of the anchor frames 110. At 210, the corresponding pixel data is fetched or obtained from the appropriate line buffer 114. Because the pixel data may be buffered at reduced vertical resolutions, at 210, the buffered data may be upsampled to obtain estimated pixel data for the current pixel. In an embodiment, an appropriate component (e.g., a dedicated hardware engine) in the compensation engine fetches the corresponding pixel data from the appropriate line buffer 114 at 210, and decompresses and upscales the fetched pixel data.

At 212, the pixel data of the corresponding pixel may be transferred from the line buffer 114 to the generated frame, e.g., the intermediate frame 106, at the position of the current target pixel.

The method of FIG. 2 result in the creation of a single intermediate frame 106. The method is repeated to generate additional intermediate frames as necessary.

Figure 3:
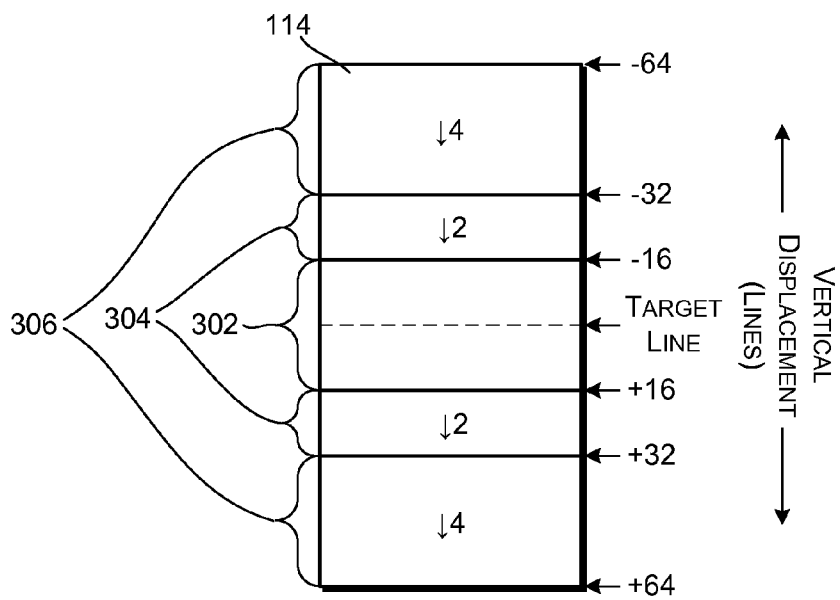
FIG. 3 is a diagram of a line buffer such as may be used in accordance with an embodiment of the present disclosure, in which lines at increasing distances from a target line are stored at decreasing levels of resolution.

FIG. 3 illustrates further details regarding the line buffers 114, described with respect to a single one of the line buffers 114. Each line buffer 114 is configured to store pixel data corresponding to a subset of the lines of the corresponding anchor frame 110, wherein the subset includes a target line (the line currently being processed by the compensation engine 104) and a range of lines that surround the target line.

The range of lines stored by the buffer 114, and the corresponding size of the buffer, may be configured in accordance with an expected vertical motion range or search range, within which pixel movement is assumed to be confined in most cases. In this example, the vertical motion range includes lines within 64 lines of the target line in both the upward and downward directions. The position of the target line within the buffer 114 and the vertical displacements relative to the target line are indicated as annotations along the right side of the illustrated buffer 114 in FIG. 3.

In an embodiment, the access buffer 114 may be divided into different sets of pixel data, corresponding to different sets or ranges of pixels or pixel lines relative to the target line. For example, the pixel data stored by the access buffer 114 may include a first set 302 of pixel data corresponding to pixels that are within a first vertical distance of the target pixel or target line. In this example, the first set 302 corresponds to pixels or pixel lines that are within +/−16 lines of the target pixel or target line. The pixel data may also include a second set 304 of pixel data corresponding to pixels that are outside the first vertical distance but within a second vertical distance of the target pixel or target line. In this example, the second set 304 corresponds to pixels or pixel lines that are between 16 and 32 lines from the target pixel or target line, in both the upward and downward directions. The pixel data may further include a third set 306 of pixel data corresponding to pixels or pixel lines that are outside the second vertical distance but within a third vertical distance of the target pixel or target line. In this example, the third set 306 corresponds to pixels or pixel lines that are between 32 and 64 lines from the target pixel or target line, in both the upward and downward directions.

In an example, the lines around the target line (e.g., the lines −64 to +64) are received in the buffer 114, for example, from the memory 112 storing the anchor frames 110. In an example, one or more lines around the target line (e.g., the lines −16 to −13) are generated, e.g., based on a 4×4 DCT compression algorithm on a raster scan basis based on pixel data received from the memory 112.

The different sets of pixel data may be stored at different vertical resolutions within the buffer 114, depending on the distances of the corresponding pixels from the target line. Specifically, pixels at larger distances from the target pixel may be represented at relatively lower vertical pixel resolutions. Such decreased vertical resolutions may be acceptable in many situations because human visual system (HVS) is relatively insensitive to large or fast vertical motion in displayed video. Thus, pixels that are the result of large vertical displacements may be displayed with decreased precision, without being noticeable to human viewers.

For example, the first set 302 of pixel data may be stored at a first resolution, which may correspond to the actual or original vertical resolution of the pixels within the anchor frame. The first set 302 of pixel data corresponds to pixels relatively near the target pixel, representing small or slow vertical motion.

The second set 304 of pixel data, however, may be downsampled and stored at a second vertical resolution that is lower than the first vertical resolution at which the first set 302 is stored, and lower than the original vertical resolution of the anchor frame. The second set 304 of pixel data corresponds to pixels that are relatively more distant from the target pixel, representing a higher degree of vertical motion. In this example, the pixel data of the second set 304 is downsampled by a factor of 2 (indicated in FIG. 3 by the symbol "↓2"), resulting in a vertical resolution within the buffer 114 that is half the first vertical resolution, and half the vertical resolution of the original anchor frame. In addition, the downsampled data within this region may be compressed by applying 4×4 DCT or wavelet compression to the data.

The result of downsampling and compressing the pixel data set 304 is a significant reduction in buffer size for this region. Specifically, the downsampling reduces the size of this portion of the buffer by half, and the subsequent compression reduces the size of this portion of the buffer by another half. This portion of the buffer is reduced in size by a factor of four in comparison to a buffering scheme that does not use downsampling or compression.

The third set 306 of pixel data may be further downsampled and stored at a third vertical resolution that is lower than the second vertical resolution at which the second set 304 is stored. The third set 306 of pixel data corresponds to pixels that are relatively distant from the target pixel, representing a relatively large degree of vertical motion. In this example, the pixel data of the third set 306 is downsampled by a factor of 4 (indicated in FIG. 3 by the symbol "↓4"), resulting in a vertical resolution within the buffer 114 that is a quarter of the first vertical resolution, and a quarter of the vertical resolution of the original anchor frame. In addition, the downsampled data within this region may be compressed by applying 4×4 DCT or wavelet compression to the downsampled data.

The result of the downsampling and compression of the pixel data set 306 is, again, a significant reduction in buffer size for this buffer region. Specifically, the downsampling reduces the size of this portion of the buffer by a factor of four, and the subsequent compression reduces the size of this portion of the buffer by another half. Thus, this portion of the buffer is reduced in size by a factor of eight in comparison to a buffering scheme that does not use downsampling or compression.

The described buffering techniques may be used in various video motion compensation applications, resulting in significant reductions in buffer memory while producing results that are unlikely to be noticeable by human users. For example, decreased vertical resolutions in an image may be acceptable in many situations because human vision visual system (HVS) is relatively insensitive to large or fast vertical motion in displayed video. Thus, pixels that are the result of large vertical displacements may be displayed with decreased precision, as described herein, without being noticeable to human viewers.

Note that the description above incorporates use of the phrases "in an embodiment," or "in various embodiments," or the like, which may each refer to one or more of the same or different embodiments. Furthermore, the terms "comprising," "including," "having," and the like, as used with respect to embodiments of the present disclosure, are synonymous.

As used herein, the terms "logic," "component," and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

The invention claimed is:

1. A video processing component comprising:
a compensation engine configured to, based at least in part on specified pixel motion, generate pixels of a first video frame from a second video frame; and
an access buffer configured to store pixel data corresponding to pixels of the second video frame for reference by the compensation engine, wherein the pixel data is stored by the access buffer at different vertical resolutions depending on vertical distances of the pixels corresponding to the pixel data from a target pixel that is indicated by the compensation engine,
wherein the pixel data stored by the access buffer corresponds to (i) a first set of pixels that are within a first vertical distance of the target pixel, and (ii) a second set of pixels that are outside the first vertical distance and within a second vertical distance of the target pixel, and
wherein (i) based on the first set of pixels being within the first vertical distance of the target pixel, the pixel data corresponding to the first set of pixels is stored at a first vertical resolution, and (ii) based on the second set of pixels being outside the first vertical distance and within the second vertical distance of the target pixel, the pixel data corresponding to the second set of pixels is stored at a second vertical resolution that is lower than the first vertical resolution.

2. The video processing component of claim 1, wherein the pixel data corresponding to pixels at increasing vertical distances from the target pixel is stored at decreasing vertical resolutions.

3. The video processing component of claim 1, wherein:
the second video frame comprises lines of pixels; and
the access buffer is repeatedly updated to store pixel data corresponding to lines of the second video frame that are vertically above and below the target pixel.

4. The video processing component of claim 1, wherein:
the pixel data stored by the access buffer corresponds to
a third set of pixels that are outside the second vertical distance and inside a third vertical distance of the target pixel; and
the pixel data corresponding to the third set of pixels is stored at a third vertical resolution that is lower than the second vertical resolution.

5. The video processing component of claim 4, wherein the pixel data corresponding to the second and third sets of pixels is vertically downsampled.

6. The video processing component of claim 4, wherein the pixel data corresponding to the second and third sets of pixels is compressed.

7. The video processing component of claim 1, wherein the pixel data corresponding to at least some of the pixels of the second video frame is vertically downsampled for storing in the access buffer.

8. A method comprising:
based at least in part on specified pixel motion, generating pixels of a first video frame from a second video frame; and
buffering pixel data corresponding to pixels of the second video frame at different vertical resolutions depending on vertical distances of the pixels corresponding to the pixel data from a target pixel of the second video frame,
wherein the buffered pixel data corresponds to (i) a first set of pixels that are within a first vertical distance of the target pixel, and (ii) a second set of pixels that are outside the first vertical distance and within a second vertical distance of the target pixel, and
wherein (i) based on the first set of pixels being within the first vertical distance of the target pixel, the pixel data corresponding to the first set of pixels is buffered at a first vertical resolution, and (ii) based on the second set of pixels being outside the first vertical distance and within a second vertical distance of the target pixel, the pixel data corresponding to the second set of pixels is buffered at a second vertical resolution that is lower than the first vertical resolution.

9. The method of claim 8, wherein the pixel data corresponding to pixels at increasing vertical distances from the target pixel is buffered at decreasing levels of vertical resolution.

10. The method of claim 8, wherein:
the second video frame comprises lines of pixels, and
the buffering comprises buffering lines of the second video frame that are vertically above and below the target pixel.

11. The method of claim 8, wherein:
the buffered pixel data corresponds to
a third set of pixels that are outside the second vertical distance and inside a third vertical distance of the target pixel; and
the pixel data corresponding to the third set of pixels is buffered at a third vertical resolution that is lower than the second vertical resolution.

12. The method of claim 11, wherein the pixel data corresponding to the second and third sets of pixels is vertically downsampled.

13. The method of claim 11, wherein the pixel data corresponding to the second and third sets of pixels is compressed.

14. The method of claim 8, further comprising vertically downsampling the pixel data corresponding to at least some of the pixels of the second video frame.

15. A software program embodied upon a non-transitory computer readable medium and operable to cause a video processing component to perform actions, wherein the actions comprise:
based at least in part on specified pixel motion, generating pixels of an intermediate video frame from an anchor video frame; and
buffering pixel data corresponding to pixels of the anchor video frame at different vertical resolutions depending on vertical distances of the pixels corresponding to the pixel data from a target pixel of the intermediate video frame,
wherein the buffered pixel data corresponds to (i) a first set of pixels that are within a first vertical distance of the target pixel, and (ii) a second set of pixels that are outside the first vertical distance and within a second vertical distance of the target pixel, and
wherein (i) based on the first set of pixels being within the first vertical distance of the target pixel, the pixel data corresponding to the first set of pixels is buffered at a first vertical resolution, and (ii) based on the second set of pixels being outside the first vertical distance and within a second vertical distance of the target pixel, the pixel data corresponding to the second set of pixels is buffered at a second vertical resolution that is lower than the first vertical resolution.

16. The software program of claim 15, wherein the pixel data corresponding to pixels at increasing vertical distances from the target pixel is buffered at decreasing levels of vertical resolution.

17. The software program of claim 15, wherein:
the anchor video frame comprises lines of pixels; and
the buffering comprises buffering lines of the anchor video frame that are vertically above and below the target pixel.

18. The software program of claim 15, wherein:
the buffered pixel data corresponds to
a third set of pixels that are outside the second vertical distance and inside a third vertical distance of the target pixel; and
the pixel data corresponding to the third set of pixels is buffered at a third vertical resolution that is lower than the second vertical resolution.

19. The software program of claim 18, wherein the pixel data corresponding to the second and third sets of pixels is vertically downsampled.

20. The software program of claim 18, wherein the pixel data corresponding to the second and third sets of pixels is compressed.

21. The software program of claim 15, the actions further comprising vertically downsampling the pixel data corresponding to at least some of the pixels of the anchor video frame which is buffered.

* * * * *